United States Patent
Wollen

(10) Patent No.: US 9,935,564 B2
(45) Date of Patent: Apr. 3, 2018

(54) PROPELLANT FLOW ACTUATED PIEZOELECTRIC IGNITER FOR COMBUSTION ENGINES

(71) Applicant: Mark A. Wollen, Murietta, CA (US)

(72) Inventor: Mark A. Wollen, Murietta, CA (US)

(73) Assignee: INNOVATIVE ENGINEERING SOLUTIONS, INC., Murietta, CA (US)

( * ) Notice: Subject to any disclaimer, the term of this patent is extended or adjusted under 35 U.S.C. 154(b) by 592 days.

(21) Appl. No.: 14/562,697

(22) Filed: Dec. 6, 2014

(65) Prior Publication Data

US 2015/0316263 A1 Nov. 5, 2015

Related U.S. Application Data

(62) Division of application No. 12/906,360, filed on Oct. 18, 2010, now Pat. No. 8,932,047.

(51) Int. Cl.
*F23Q 3/00* (2006.01)
*H02N 2/18* (2006.01)
*F02P 3/12* (2006.01)

(52) U.S. Cl.
CPC .............. *H02N 2/183* (2013.01); *F02P 3/12* (2013.01); *F23Q 3/002* (2013.01); *H02N 2/185* (2013.01); *Y10T 137/7905* (2015.04); *Y10T 292/0809* (2015.04); *Y10T 292/11* (2015.04); *Y10T 292/14* (2015.04)

(58) Field of Classification Search
CPC . F02P 3/12; F23Q 3/002; H02N 2/183; H02N 2/185; Y10T 137/7905; Y10T 292/14; Y10T 292/11; Y10T 292/0809
See application file for complete search history.

(56) References Cited

U.S. PATENT DOCUMENTS

| | | | |
|---|---|---|---|
| 7,397,170 B2 | 7/2008 | Ichikawa | |
| 7,555,938 B2 | 7/2009 | Bargatin et al. | |
| 7,565,795 B1 | 7/2009 | Horn et al. | |
| 7,578,279 B2 | 8/2009 | Ehresman | |
| 2009/0173321 A1 | 7/2009 | Horn et al. | |
| 2009/0236441 A1 | 9/2009 | Hess et al. | |

*Primary Examiner* — Alfred Basichas
(74) *Attorney, Agent, or Firm* — McGahey & McGahey, APLC.; Harry V. McGahey, Esq.

(57) ABSTRACT

A propellant flow actuated piezoelectric igniter device using one or more hammer balls retained by one or more magnets, or other retaining method, until sufficient fluid pressure is achieved in one or more charging chambers to release and accelerate the hammer ball, such that it impacts a piezoelectric crystal to produce an ignition spark. Certain preferred embodiments provide a means for repetitively capturing and releasing the hammer ball after it impacts one or more piezoelectric crystals, thereby oscillating and producing multiple, repetitive ignition sparks. Furthermore, an embodiment is presented for which oscillation of the hammer ball and repetitive impact to the piezoelectric crystal is maintained without the need for a magnet or other retaining mechanism to achieve this oscillating impact process.

33 Claims, 4 Drawing Sheets

PROPELLANT FLOW ACTUATED PIEZOELECTRIC IGNITER FOR COMBUSTION ENGINES

CROSS REFERENCE TO RELATED APPLICATIONS

This is a division of application Ser. No. 12/906,360 Filed 18 Oct. 2010.

STATEMENT REGARDING FEDERALLY SPONSORED RESEARCH OR DEVELOPMENT

A portion of the research related to an embodiment of the present invention was partially funded by a Federally funded government contract under NASA Small Business Research and Development (SBIR) Phase I contract number NNX10CD19P, issued to Innovative Engineering Solutions on 29 Jan. 2010 and completed on 29 Jul. 2010.

DESCRIPTION OF ATTACHED APPENDIX

Not Applicable

BACKGROUND OF THE INVENTION

Because of the severe stress put on the ignition of rocket engines in rocket powered systems, gas turbine engines, and other similar combustion devices, and the catastrophic result of a failure to timely and reliably ignite them, there has always been a need for a reliable engine igniter which would be able to be accurately timed to ignite when desired.

Piezoelectric crystals have been used commonly as spark ignition sources for stoves and barbeque lighters, but the actuation mechanism usually consists of a mechanically actuated hammer that is driven by some sort of spring mechanism.

Prior piezoelectric ignition systems have been patented but in prior patented devices it is not clear that as a practical matter sufficient force will be generated by any of the described methods, or that the impulse applied to the crystal will be of sufficient magnitude or be applied at a rapid enough rate to produce a strong spark.

Information relevant to attempts to address these and other problems can be found in U.S. Patent Application and U.S. Pat. Nos. 2009/0236441 A1, 2009/0173321 A1, 7,578, 279 B2, 7,565,795 B1, 7,555,938 B2, 7,397,170 B2. However, each one of these references suffers from one or more of the above disadvantages related to insufficiency of spark strength:

In an attempt to produce a satisfactory spark strength, some prior patents have attempted to solve this problem by describing possible methods of spreading the gas pressure over a larger area, and attempting to increase the force applied to the piezoelectric crystal proposing to use impingement of the gas force directly onto the piezoelectric crystal, or through an attached intermediary connecting element, but to date none of these prior inventions have been practically successful in solving this problem. Others have used a fluidic oscillator as a means of repetitively exciting a piezoelectric crystal, however a description of such a necessary fluidic oscillator is not provided. Specifically, although force conveying elements means connecting the source of fluid pressure to the piezoelectric crystal are mentioned, no actual specific means of using the fluid pressure to accelerate a solid mass to a high enough velocity, so as to subsequently impact the crystal or connected force conveying elements, is specified. A specific method, hitherto unknown, is critical for actually being able to obtain a sufficiently strong, reliable spark from the piezoelectric crystal of sufficient strength to ignite a rocket engine, a gas turbine engine, or other combustion device and this is precisely what the embodiment of the present invention disclosed in this patent provides.

The embodiment of the present invention presently disclosed overcomes these shortcomings by retaining a hammer ball in a controlled manner until sufficient energy has been stored in the actuating gas to then accelerate the hammer ball to sufficient velocity to attain sufficient rapid impulse necessary to obtain a strong piezoelectric crystal response.

Although the shape of the hammer element in the preferred embodiment is referred to as a ball, and it is presently envisioned that this spherical shape might be desirable, it is by no means the only shape that might be employed for the sliding hammer element.

For the foregoing reasons, there is a need for a specific method to produce a sufficiently and reliably strong spark response so as to be able to ignite a rocket or other similar type of propulsion system.

SUMMARY

The present invention is directed to an apparatus that satisfies the need to produce a sufficiently and reliably strong spark response so as to be able to ignite a rocket engine, gas turbine engine, or other similar type of propulsion system. The primary object of the invention is to provide a better method of igniting rocket propulsion systems.

Another object of the invention is to provide a piezoelectric igniter which is simpler in design, installation, and operation than any currently existing device. Unlike other rocket engine igniter systems to date, no electronics or wiring is required to generate the ignition spark in the present invention.

Another object of the invention is to provide a rocket propulsion ignition system which is aimed at, but not limited to, taking advantage of the fluid dynamics of the propellant flow to excite a piezoelectric crystal.

Other objects and advantages of the present invention will become apparent from the following descriptions, taken in connection with the accompanying drawings, wherein, by way of illustration and example, several alternative embodiments of the present invention are disclosed.

In accordance with one preferred embodiment of the invention, there is disclosed an igniter comprising a fuel supply line connected to a fuel inlet valve, an oxidizer supply line connected to an oxidizer inlet valve, the fuel inlet valve connected to an upstream gas chamber, a magnet, a hammer ball held next to the magnet by magnetic force, a guide tube surrounding the hammer ball to guide the hammer ball when it is released from the magnet, two piezoelectric crystals, each with upstream charging chambers, flow by-pass pathway on the guide tube connected to an injector tube, an injector tube surrounding the piezoelectric crystals connected to the guide tube, an ignition zone at one end of the injector tube, a conduction path electrode leading from the piezoelectric crystals to the ignition zone, a high dielectric strength insulating material surrounding the conduction path electrode, a discharge spark created when the hammer ball strikes the piezoelectric crystal, and a grounding connection for the piezoelectric crystals.

BRIEF DESCRIPTION OF THE DRAWINGS

The drawings constitute a part of this specification and include exemplary embodiments of the present invention, which may be embodied in various forms. It is to be understood that in some instances various aspects of the embodiment of the present invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
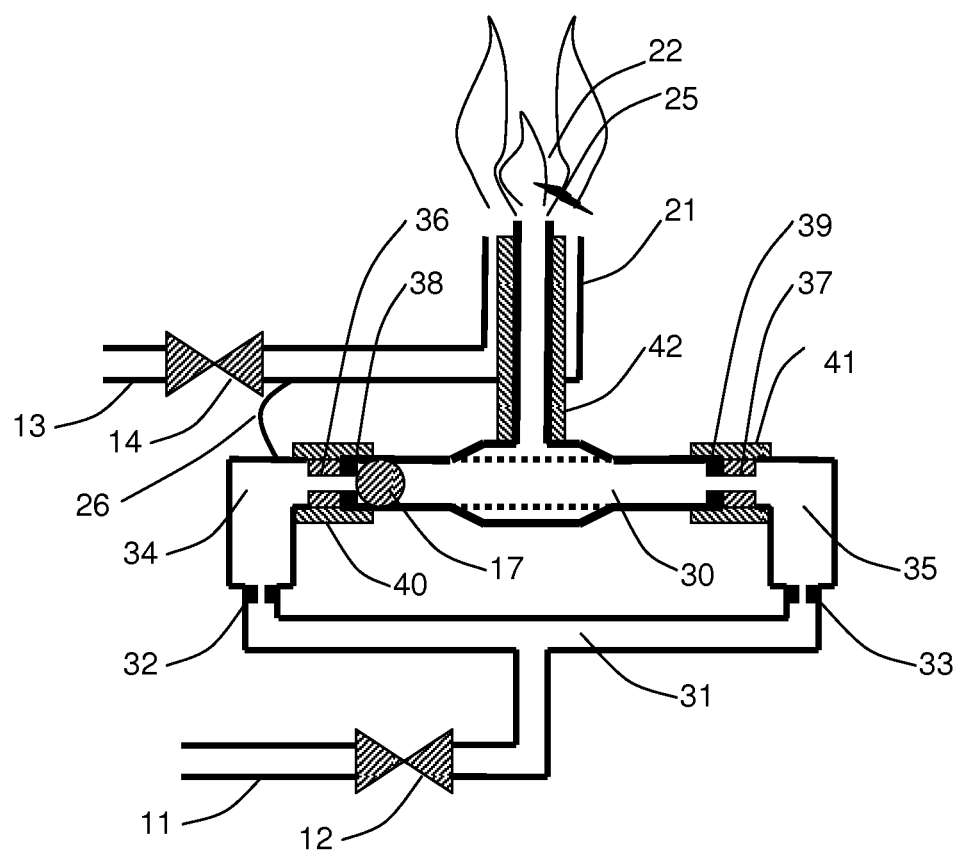
FIG. 1 is a schematic diagram illustrating the parts of an embodiment of the embodiment of the present invention wherein there are two piezoelectric crystals used to produce a repetitive series of sparks.

FIG. 1 shows an embodiment capable of driving a hammer ball in an oscillating manner, wherein each magnet is in contact with a piezoelectric crystal thereby functioning as an anvil (anvil magnet), thereby producing a repetitive series of sparks when gas flow is supplied. The hammer ball is driven alternately from one side to the other, impacting anvil magnets at each end, and causing the piezoelectric crystals to create repetitive discharge sparks.

In this embodiment, there are two piezoelectric crystals (36) and (37), each directly in contact with anvil magnets (38) and (39), each with upstream charging chambers (34) and (35). When the fuel gas valve (12) is opened, gas enters a distribution flow path (31) and is supplied to each said charging chamber through charging orifices (32 and 33). The first charging chamber (34) is supplied with gas through the first charging orifice (32), and the second charging chamber (35) is supplied with gas through the second charging orifice (33). The piezoelectric crystal can be anchored next to the anvil magnet in contact with it or it can be attached directly to the anvil magnet in contact with it.

The first charging chamber (34) has an outlet path through or around the first piezoelectric crystal (36), and the second charging chamber (35) has an outlet path through or around the second piezoelectric crystal (37). Each of the outlet paths through or around piezoelectric crystals (36 and 37) attach to opposing ends of the oscillating ball guide tube (30).

The oscillating ball guide tube (30) is sized to contain the hammer ball (17), and furthermore has an intersecting outlet flow path allowing any flow entering the oscillating ball guide tube (30) to move up the injector tube (21) and enter the ignition zone (22).

The path connecting the oscillating ball guide tube (30) to the injector tube (21) is shown at the center of the oscillating ball guide tube in FIG. 1, although this is not necessarily a requirement of the embodiment of the present invention, and alternative, asymmetrical arrangements could be employed.

A magnet is employed between each piezoelectric crystal (35 and 36) and the oscillating ball guide tube (30). These magnets are bonded to, or are in contact with, the piezoelectric crystal, such that when the hammer ball (17) impacts one of the magnets, the impulse is transferred to the contacting piezoelectric crystal. Hence, as illustrated in FIG. 1, these magnets function as anvils. The magnet adjoining the first piezoelectric crystal (36) is referred to as the first anvil magnet (38), and the magnet adjoining the second piezoelectric crystal (37) is referred to as the second anvil magnet (39). This configuration combining the anvil and magnet functions is not mandatory for the invention, and alternative configurations with separate anvils and retaining magnets may be employed.

An additional feature of anvil magnets (38 and 39) is that they have a flow path through or around them that is blocked by the hammer ball (17) when the hammer ball is in contract with, or drawn into close proximity of, either anvil magnet.

Prior to opening fuel inlet valve (12), hammer ball (17) will normally reside in contact with either the first anvil magnet (38) or the second anvil magnet (39), depending on where operation of the device was last stopped. If hammer ball (17) is residing in contact with the first anvil magnet (38) when fuel inlet valve (12) is opened, pressure will increase substantially in the first charging chamber (34), since flow cannot escape.

If the hammer ball (17) is residing in contact with second anvil magnet (39), and provided that first charging orifice (32) is properly sized relative to the open flow path through or around the first piezoelectric crystal (36) and first anvil magnet (38), the increase in pressure in the first charging chamber (34) will be relatively small when the fuel inlet valve (12) is opened.

Proper sizing of the first charging orifice (32) relative to the downstream flow path through or around the first piezoelectric crystal (36) and anvil magnet (38) to achieve this pressure condition is comprised of assuring that the first charging orifice (32) provides more flow restriction compared to the flow restriction in the downstream open flow paths. In this embodiment of the present invention an identical condition and design requirement applies to the second charging chamber (35), associated flow paths, and second charging orifice (33).

When the above design conditions are met, opening the fuel inlet valve (12) will cause gas to flow through the unblocked charging chamber (35 or 34), into the oscillating ball guide tube (30), and towards the ignition zone (22). Meanwhile, pressure will increase in the opposite charging chamber (34 or 35) for which the outlet flow path is blocked by the hammer ball (17). When the force caused by the pressure in the blocked charging chamber exceeds the retaining force of the appropriate anvil magnet (38 or 39), the hammer ball (17) will be released and accelerated by the high pressure gas contained in the said charging chamber. The hammer ball (17) will then impact the opposing anvil magnet (39 or 38), causing a high voltage to be produced by the associated piezoelectric crystal and simultaneously blocking the flow path through or around the newly contacted anvil magnet. Pressure will then increase in the charging chamber associated with the newly blocked flow path until it is sufficient to cause the hammer ball (17) to be released and accelerate back to the first anvil magnet. This process will repeat itself indefinitely, creating repetitive discharge sparks (25), so long as fuel gas is supplied through fuel inlet valve (12), and sufficient pressure drop is available from fuel supply line (11) to the ignition zone (22) to drive the hammer ball (17) off the anvil magnets (38 or 39).

Should the injector tube (21) and ignition zone (22) discharge directly into a rocket engine or some other downstream combustion chamber, an additional feature of this embodiment of the present invention is that, when ignition takes place and the downstream combustion chamber pressure rises such that the pressure in the ignition zone (22) also becomes elevated, it is possible to select magnetic strength of anvil magnets (38 and 39) such that the supply pressure to the fuel supply line (11) will then be insufficient to overcome the retaining force between the anvil magnets (38 or 39) and the hammer ball (17). Oscillation of the hammer ball and resulting repetitive spark generation will then cease. Should the downstream rocket engine or other combustion chamber "flame out", the pressure at ignition zone (22) will drop and the oscillatory process will then automatically resume to provide repetitive discharge sparks (25) and attempt to re-ignite combustion.

An additional advantage of this embodiment of the present invention is that the hammer ball (17) is attracted to either the first or second anvil magnet when gas supply is turned off, eliminating need for a spring or other optional mechanism to assure the hammer ball is properly repositioned following operation.

The oxidizer supply valve (14), may be opened prior to, concurrently, or after the fuel inlet valve (12) is opened, depending on other considerations of the combustion ignition process. Timing of the oxidizer supply flow is not critical with respect to the spark generation process.

Although the oscillatory, embodiment discussed above describes the device as operating with fuel being used as the driving gas, the embodiment of the present invention could equally be configured to employ the oxidizer as the driving gas, or might even make use of a third inert gas, such as nitrogen, to operate the device. Also, as with the first, or baseline, embodiment, other factors may dictate which gas is supplied through the core region of the injector tube (21) and which gas is supplied through the annular region surrounding the core.

Figure 2:
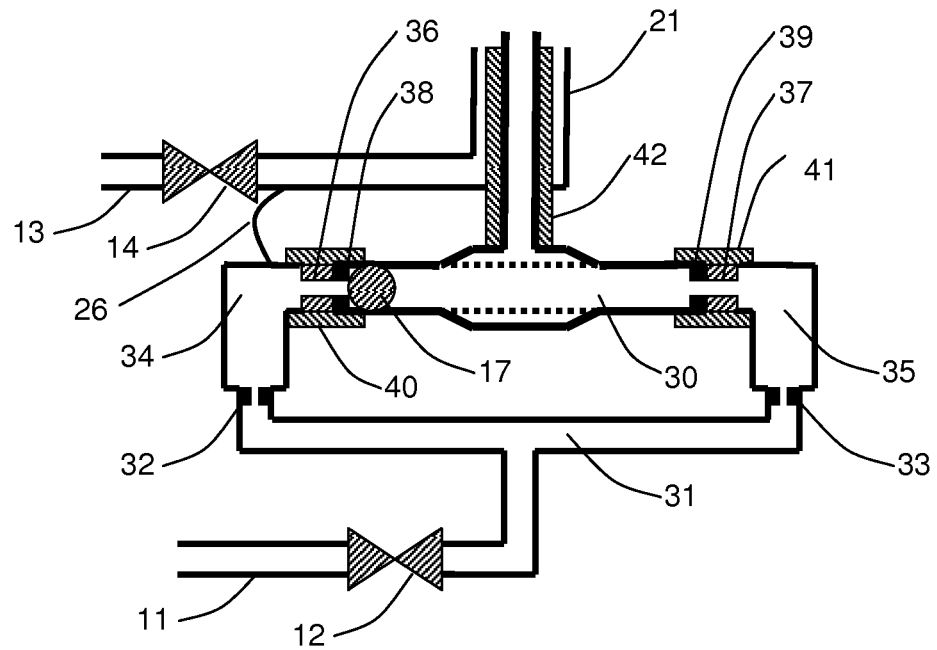
FIG. 2 is a schematic diagram illustrating the first step in the sequence of operation of an embodiment of the present invention with two piezoelectric crystals when the hammer ball is rested in a seated position.

FIGS. 2 through 6 illustrate the oscillatory process of the embodiment of the present invention. To begin this series of illustrations, it is assumed that the process starts with hammer ball (17) resting in a seated position against the first anvil magnet (38), as shown in FIG. 2.

Figure 3:
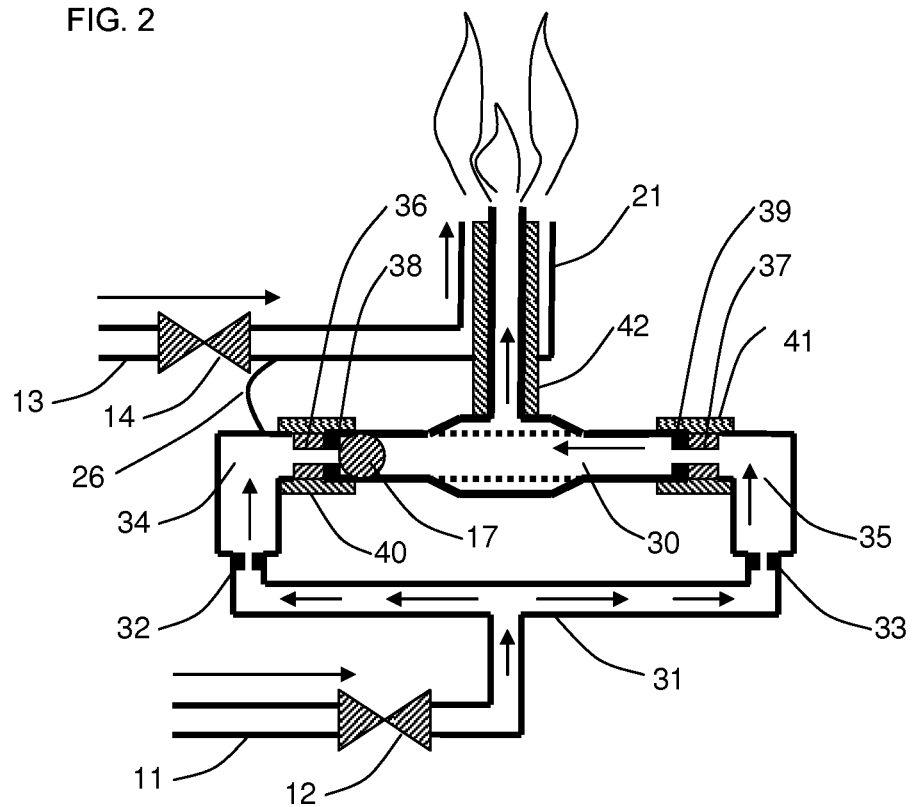
FIG. 3 is a schematic diagram illustrating the first step in the sequence of operation of an embodiment of the present invention with two piezoelectric crystals when the fuel and oxidizer valves have just been opened.

In FIG. 3, fuel and oxidizer valves (12) and (14) have just been opened, and pressure starts to build in first charging chamber (34) that is blocked by hammer ball (17), while gas flows freely through the second charging chamber (35) to supply the injector tube (21) and ignition zone (22). Arrows are included in FIG. 3 to illustrate the flow of gases.

Figure 4:
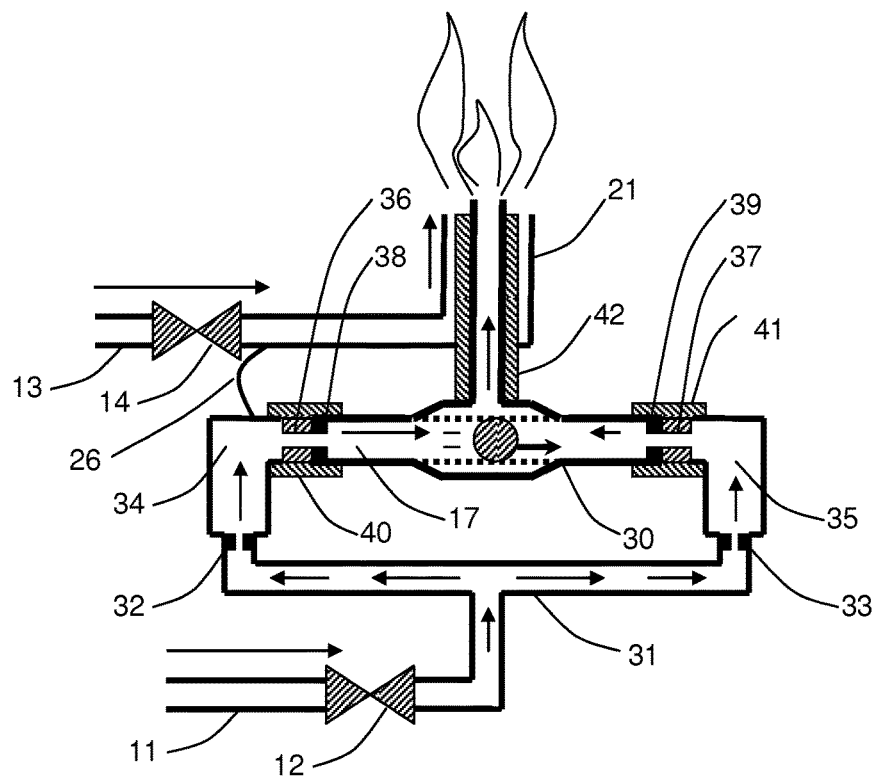
FIG. 4 is a schematic diagram illustrating the first step in the sequence of operation of an embodiment of the present invention with two piezoelectric crystals when the hammer ball has been released from the first anvil magnet.

In FIG. 4, sufficient pressure has been reached in the first charging chamber (34), and the hammer ball (17) has been released from first anvil magnet (38) and is being accelerated towards second anvil magnet (39). The bold arrow indicates the direction of motion of the hammer ball (17).

Figure 5:
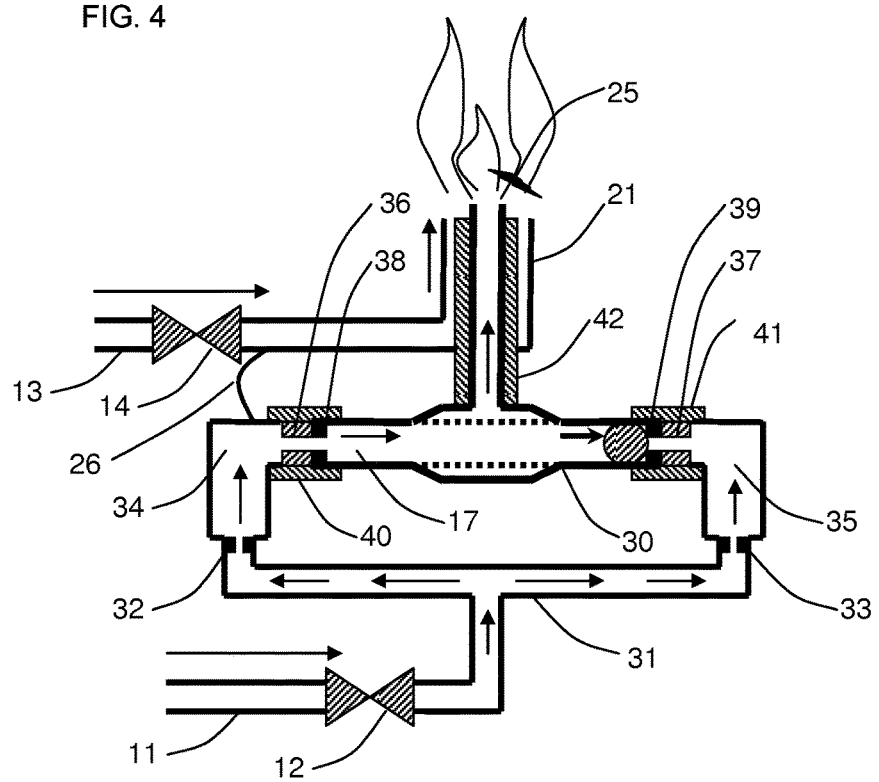
FIG. 5 is a schematic diagram illustrating the first step in the sequence of operation of an embodiment of the present invention with two piezoelectric crystals when the hammer ball is impacting the second magnet.

FIG. 5 shows hammer ball (17) impacting second anvil magnet (39), transferring impulse to second piezoelectric crystal (37), and causing discharge spark (25). Hammer ball (17) is now blocking flow from passing through or around second anvil magnet (39), and the pressure in second charging chamber (35) consequently increases, while gas flows freely through the first charging chamber (34) to supply the injector tube (21) and ignition zone (22).

Figure 6:
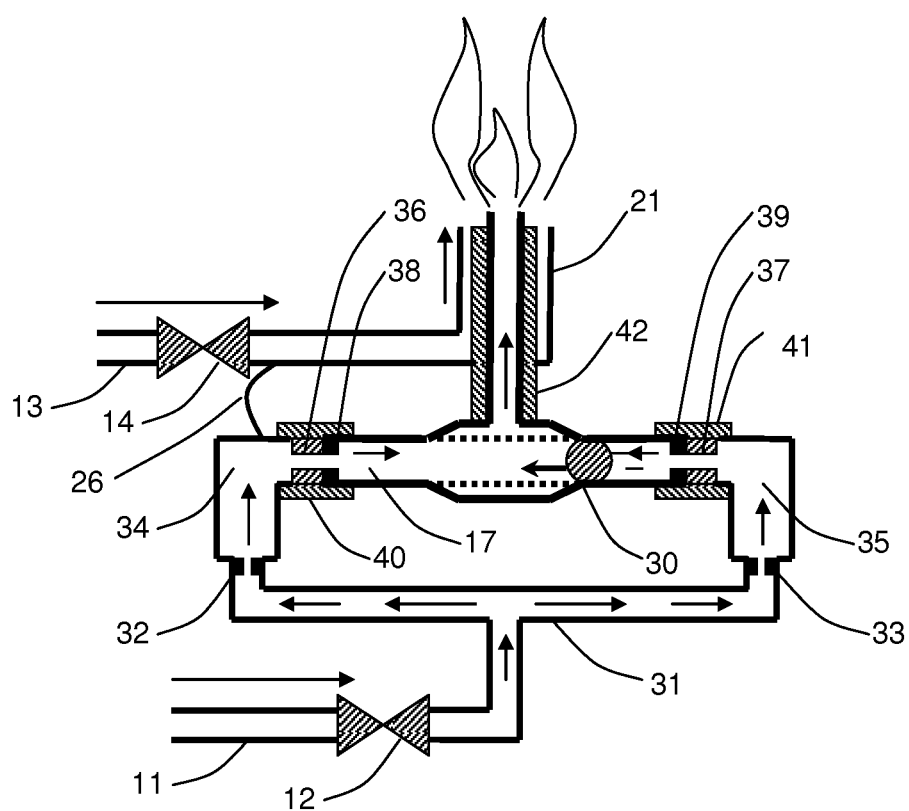
FIG. 6 is a schematic diagram illustrating the first step in the sequence of operation of an embodiment of the present invention with two piezoelectric crystals when the hammer ball is driven back towards the first anvil magnet.

FIG. 6 shows conditions occurring soon after pressure in second charging chamber (35) has reached a level sufficient to drive hammer ball (17) from second anvil magnet (39). Hammer ball (17) is driven back towards first anvil magnet (38) and first piezoelectric crystal (36). This process repeats itself, causing multiple discharge sparks as the hammer ball alternately impacts alternate anvil magnets (38 and 39), transferring impulse to the piezoelectric crystals (36 and 37).

Alternatively, with proper sizing of the primary and secondary charging orifices, and proper selection of the length of the guide tube and mass of the hammer ball, it is possible to cause the hammer ball to oscillate and repetitively impact the piezoelectric crystal without the need for magnets (38 and 39) and associated seals. The hammer ball is then operated continuously in a cycle to create reciprocating repeating sparks so long as needed.

This can be made to occur by sizing the secondary charging orifice (33) such that pressure in the return gas chamber (35) does not increase so rapidly that the hammer ball reverses direction prior to impacting the piezoelectric crystal, yet increases sufficiently to drive the hammer ball back towards the primary charging orifice (32). Similarly, the first charging orifice (32) can be sized to cause sufficient pressure to build up in the upstream gas chamber (34) without contacting the primary magnet (38), such that the hammer ball reverses direction and is accelerated with sufficient velocity to again impact the piezoelectric crystal with sufficient impulse to generate the required spark. This oscillating process will continue as long as the fuel inlet valve (12) is open and sufficient pressure drop is available between the fuel supply line (11) and the ignition zone (22).

Should the injector tube (21) and ignition zone (22) discharge directly into a rocket engine or some other downstream combustion chamber, an additional feature of this embodiment is that, when ignition takes place and the downstream combustion chamber pressure rises such that the pressure in the ignition zone (22) also becomes elevated, it is possible to select a supply pressure to the fuel supply line (11) that will then be insufficient to overcome the retaining force between the magnets (38 or 39) and the hammer ball (17), or otherwise be insufficient to maintain oscillation of the hammer ball. Oscillation of the hammer ball and resulting repetitive spark generation will then cease. Should the downstream rocket engine or other combustion chamber "flame out", the pressure at ignition zone (22) will drop and the oscillatory process will then automatically resume to provide repetitive discharge sparks (25) and attempt to re-ignite combustion.

Although the embodiments discussed above and illustrated in FIGS. 1 through 6 employ one or more magnets for retaining the hammer ball until sufficient pressure is developed, the use of these magnets may be convenient but is not mandatory or essential to the operation of the current invention.

Furthermore, although the hammering element is always described and drawn as a spherical ball, this also is not an essential feature of the invention. Other hammer shapes, such as cylindrical, could be employed, and might be found advantageous, rather than a spherical ball Further, the hammer ball itself could be made of any sufficiently strong magnetic material such as Niobium, with the fixed magnets replaced by any suitable ferromagnetic material, thereby producing a similar attractive effect. In addition, the hammer ball could be positioned so as to momentarily block the flow out of an alternate gas charging chamber or chambers causing pressure to build while flow through the opposite magnet and crystal or other ignition means supplied flow to the injector.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A propellant flow actuated piezoelectric igniter, comprising:
    a fuel supply line connected to a fuel inlet valve;
    an oxidizer supply line connected to an oxidizer inlet valve;
    the fuel inlet valve connected to an upstream gas chamber;
    a first magnet;
    a second magnet;
    a hammer ball held next to the first magnet by magnetic force;
    an oscillating hammer ball guide tube surrounding the hammer ball to guide the hammer ball when it is released from the first magnet;
    a first piezoelectric crystal at one end of the guide tube, with its own separate first upstream charging chamber;
    a second piezoelectric crystal at one end of the guide tube, with its own separate second upstream charging chamber;
    a distribution flow path means from the fuel inlet valve to a charging orifice for charging each upstream charging chamber;
    a means for the first charging chamber to be supplied with gas through the first charging orifice;
    a means for the second charging chamber to be supplied with gas through the second charging orifice;
    the first charging chamber having an outlet path surrounding the first piezoelectric crystal;
    the second charging chamber having an outlet path surrounding the second piezoelectric crystal;
    each of the outlet paths through or around first and second piezoelectric crystal attaches to the opposing ends of the oscillating ball guide tube;
    an injector tube surrounding each of the piezoelectric crystals connected to the guide tube;
    a flow by-pass pathway on the guide tube connected to each injector tube;
    an ignition zone at one end of each injector tube;
    a conduction path electrode leading from each of the piezoelectric crystals to its corresponding ignition zone;
    a grounding connection for each of the piezoelectric crystals; and
    a high dielectric strength insulating material surrounding each conduction path electrode such that a discharge spark is created when the oscillating hammer ball strikes each piezoelectric crystal.

2. A propellant flow actuated piezoelectric igniter as claimed in claim 1 wherein the first charging chamber has an outlet path through a cavity inside of the first piezoelectric crystal.

3. A propellant flow actuated piezoelectric igniter as claimed in claim 1 wherein the second charging chamber has an outlet path through a cavity inside of the second piezoelectric crystal.

4. A propellant flow actuated piezoelectric igniter as claimed in claim 1 wherein the electrode is a hollow tube.

5. A propellant flow actuated piezoelectric igniter as claimed in claim 1 wherein the electrode is a solid rod.

6. A propellant flow actuated piezoelectric igniter as claimed in claim 1 wherein an anvil transfers the force to the crystal.

7. A propellant flow actuated piezoelectric igniter as claimed in claim 1 wherein an anvil is attached directly to the crystal.

8. A propellant flow actuated piezoelectric igniter as claimed in claim 1 wherein a spring is used as a return means to return the ball to its original position.

9. A propellant flow actuated piezoelectric igniter as claimed in claim 1 wherein the ball oscillates against one piezoelectric crystal which is surrounded by an isolated return chamber gas supply path open to primary and secondary charging.

10. A propellant flow actuated piezoelectric igniter as claimed in claim 1 wherein the orifices are sealed with a return chamber seal means.

11. A propellant flow actuated piezoelectric igniter as claimed in claim 1 wherein leakage of combustion fuel flowing past the hammer ball is sufficient to supply combustion fuel to the ignition zone.

12. A propellant flow actuated piezoelectric igniter as claimed in claim 1 wherein leakage of flow past the hammer ball as it moves through the guide tube is also routed to the injector tube sufficiently to supply combustion fuel to either or both ignition zones so that there is no need for a flow by-pass path.

13. A propellant flow actuated piezoelectric igniter as claimed in claim 1 wherein insulated wires are used to convey electrical energy generated by the piezoelectric crystal to the ignition zone.

14. A propellant flow actuated piezoelectric igniter as claimed in claim 1 wherein an adjustable separator means is placed between the hammer ball and the magnet so as to be able to adjust the amount of magnetic force holding the hammer ball in place.

15. A propellant flow actuated piezoelectric igniter as claimed in claim 1 wherein the magnet itself has sufficient magnetic attraction to return the hammer ball after it has struck the piezoelectric crystal to its original position.

16. A propellant flow actuated piezoelectric igniter as claimed in claim 1 wherein gravity is employed to return the hammer ball.

17. A propellant flow actuated piezoelectric igniter as claimed in claim 1 wherein a return means is used to return the ball to its original position.

18. A propellant flow actuated piezoelectric igniter as claimed in claim 1 wherein the hammer ball is operated by a combustible fuel gas.

19. A propellant flow actuated piezoelectric igniter as claimed in claim 1 wherein the hammer ball is operated by an oxidizer gas.

20. A propellant flow actuated piezoelectric igniter as claimed in claim 1 wherein the hammer ball is operated by a third inert gas.

21. A propellant flow actuated piezoelectric igniter as claimed in claim 1 wherein the third inert gas is nitrogen.

22. A propellant flow actuated piezoelectric igniter as claimed in claim 1 wherein a cryogenic propellant is supplied to the upstream gas chamber.

23. A propellant flow actuated piezoelectric igniter as claimed in claim 1 wherein the cryogenic propellant supplied to the upstream gas chamber is liquid hydrogen.

24. A propellant flow actuated piezoelectric igniter as claimed in claim 1 wherein the cryogenic propellant supplied to the upstream gas chamber is liquid oxygen.

25. A propellant flow actuated piezoelectric igniter as claimed in claim 1 wherein the propellant delivered to the ignition zone for combustion which does not play a role in actuating a piezoelectric, is delivered in a gaseous state.

26. A propellant flow actuated piezoelectric igniter as claimed in claim 1 wherein the propellant delivered to the ignition zone for combustion which does not play a role in actuating the piezoelectric, is delivered in a liquid state.

27. A propellant flow actuated piezoelectric igniter as claimed in claim 1 wherein fuel, or an oxidizer, or an inert gas, is supplied through the core region of the injector tube, and fuel, or an oxidizer, or an inert gas, is delivered through an annular region surrounding the core.

28. A propellant flow actuated piezoelectric igniter as claimed in claim 1 wherein the hammer ball itself is comprised of a magnetic material.

29. A propellant flow actuated piezoelectric igniter as claimed in claim 1 wherein the hammer ball itself is comprised of niobium.

30. A propellant flow actuated piezoelectric igniter as claimed in claim 1 wherein the hammer ball is operated continuously in a cycle to create reciprocating repeating sparks so long as needed.

31. A propellant flow actuated piezoelectric igniter as claimed in claim 1 wherein the hammer ball is operated continuously in a cycle, impacting anvil magnets at each end, and causing the piezoelectric crystals to create repetitive discharge sparks.

32. A propellant flow actuated piezoelectric igniter as claimed in claim 1 wherein as the hammer ball is operated continuously in a cycle, impacting anvil magnets at each end, the hammer ball when it is at each alternate end of each alternate gas chamber, momentarily blocks the flow out of one gas charging chamber thereby causing pressure to build at one gas charging chamber while flow through the opposite magnet and piezoelectric crystal flow path supplies a flow to the injector.

33. A propellant flow actuated piezoelectric igniter as claimed in claim 1 wherein orifices, guide tube length, and hammer ball mass are sized such that oscillation of the hammer ball and repetitive impact to the piezoelectric crystal is achieved without the need for magnets to maintain this oscillatory process.

* * * * *